United States Patent [19]
Kim

[11] Patent Number: 6,164,038
[45] Date of Patent: Dec. 26, 2000

[54] HEATER ASSEMBLY FOR AUTOMATIC TABLET SORTING AND COUNTING MACHINE

[76] Inventor: Jin Soo Kim, 100-23 Galsandong, Dalsuhgu, Taegu, Rep. of Korea

[21] Appl. No.: 09/353,308

[22] Filed: Jul. 14, 1999

[30] Foreign Application Priority Data

Jul. 14, 1998 [KR] Rep. of Korea ....................... 13263/98

[51] Int. Cl.[7] .................................................. B65B 51/16
[52] U.S. Cl. ...................... 53/374.4; 53/133.8; 53/374.2; 53/155; 53/168; 53/238
[58] Field of Search .............................. 53/154, 155, 168, 53/277, 238, 445, 474, 133.8, 374.2, 374.4

[56] References Cited

U.S. PATENT DOCUMENTS

| | | | |
|---|---|---|---|
| 4,244,158 | 1/1981 | Nelham . | |
| 4,254,601 | 3/1981 | Prager et al. . | |
| 4,790,118 | 12/1988 | Chilcoate | 53/451 X |
| 5,481,855 | 1/1996 | Yuyama | 53/168 X |
| 5,671,592 | 9/1997 | Yuyama et al. | 53/168 X |
| 5,678,393 | 10/1997 | Yuyama et al. | 53/168 X |
| 5,709,063 | 1/1998 | Yuyama et al. | 53/168 X |
| 5,722,215 | 3/1998 | Yuyama . | |
| 5,787,678 | 8/1998 | Koike et al. | 53/168 X |
| 5,839,257 | 11/1998 | Soderstrom et al. | 53/168 X |
| 5,875,610 | 5/1999 | Yuyama et al. | 53/168 X |

*Primary Examiner*—Daniel B. Moon
*Attorney, Agent, or Firm*—John K. Park; Park & Sutton LLP

[57] ABSTRACT

A heater assembly for an automatic tablet dispenser is disclosed. The heater assembly includes a pair of heating rollers respectively having an insertion hole formed through each shaft thereof to receive a heating line therethrough, and a pair of peripheral sealing surfaces and a pair of axial sealing surfaces are appropriately provided on the heating rollers. The packaging paper is foldedly provided between the corresponding pair of sealing surfaces of the heating rollers. The sealing surfaces of the heater assembly has a plurality of continuously-and-linear ridged teeth formed on and along said sealing surfaces, thereby preventing a paper slipping phenomenon from occurring during the paper sealing process.

3 Claims, 3 Drawing Sheets

HEATER ASSEMBLY FOR AUTOMATIC TABLET SORTING AND COUNTING MACHINE

BACKGROUND OF THE INVENTION

1. Field of Invention

The present utility model relates to a heater assembly for an automatic tablet sorting and counting machine commonly referred to as "automatic tablet dispenser", and more specifically to an improved heater assembly for an automatic tablet dispenser which enables the tablets dropped from a tablet dropping unit to be packaged into a provided portion of packaging paper.

2. Description of the Prior Art

Automatic tablet dispensers are generally employed in hospitals, pharmacies, and drugstores to automate the output and assembly of corresponding tablets when the prescription is input into a computer. They serve to dispense the per-dosage assembled tablets in individual single serving packages.

A conventional automatic tablet dispenser includes the following: a main computer for calculating an appropriate prescription on the basis of the type of medicine, intake method, daily intake frequency and intake duration depending upon each patient; a tablet dropping unit having a plurality of tablet cassettes and a drum for storing therein and releasing therefrom the tablets in correspondence to the prescription set up in the computer; and a packaging unit disposed below the tablet dropping unit which serves to package a quantity of tablets and release the same to an exterior of the automatic tablet dispenser.

The packaging unit is made up of: a discharge hopper for assembling the tablets being dropped from the tablet drop unit; a heater assembly for packaging the tablets being discharged through the discharge hopper; a printer for printing respective information on packaging paper; and a release conveyer for externally discharging the medicine bags containing tablets.

The heating assembly in the packaging unit serves to serially seal one-time dosage paper sections of provided packaging paper. Here, the one-time dosage paper contains one-time dosage of tablets. That is, a pair of heating rollers are provided to pull while sealing the supplied packaging paper. The heater assembly in the automatic tablet dispensing system performs sealing and partial cutting of the provided packaging paper.

A disadvantage of conventional heating rollers is that they have flat sealing surface so that there may occur a slipping phenomenon during the pulling and sealing process, thereby deteriorating a smooth pulling of the packaging paper. Furthermore, when the packaging paper is not accurately pulled between the heating rollers due to such a slipping phenomenon, a next batch of tablets may be dropped before the initial batch tablets are packaged, thereby deteriorating a smooth packaging operation of the dropping tablets.

SUMMARY OF THE INVENTION

The present utility model is contrived to overcome the conventional disadvantages.

Therefore, it is an object of the present utility model to provide a heater assembly for an automatic tablet dispenser, capable of preventing a slipping phenomenon from occurring during sealing of packaging paper by improving a heating roller of the heater assembly, thereby facilitating the tablet packaging operation To achieve the above-described object, there is provided a heater assembly for an automatic tablet dispenser according to the present utility model, which includes a pair of heating rollers each having an insertion hole formed through each shaft thereof to receive a heating line therethrough and a pair of peripheral sealing surfaces and a pair of axial sealing surfaces. The packaging paper is foldedly provided between the corresponding pair of sealing surfaces of the heating rollers. The heating surfaces of the heating rollers have a plurality of continuously-and-linearly ridged teeth formed on and along the sealing surfaces to prevent paper slippage and to effect better sealing.

An advantage of the present invention is to enable a tablet taking consumer to easily rip off the sealed tablet package along any of its linearly impressed ridge lines by providing the continuously-and-linearly ridged teeth along the outer surface of the heating rollers. Another advantage is to allow the owner of the tablet dispensing system having the heating assembly according to the present invention to select a tougher packaging paper so that the tablets sealed within the selected tablet packaging paper can be further safely protected from an unwanted tearing.

DETAILED DESCRIPTION OF THE PREFERRED EMBODIMENTS

With reference to the accompanying drawings, the present utility model will now be described.

Figure 1:
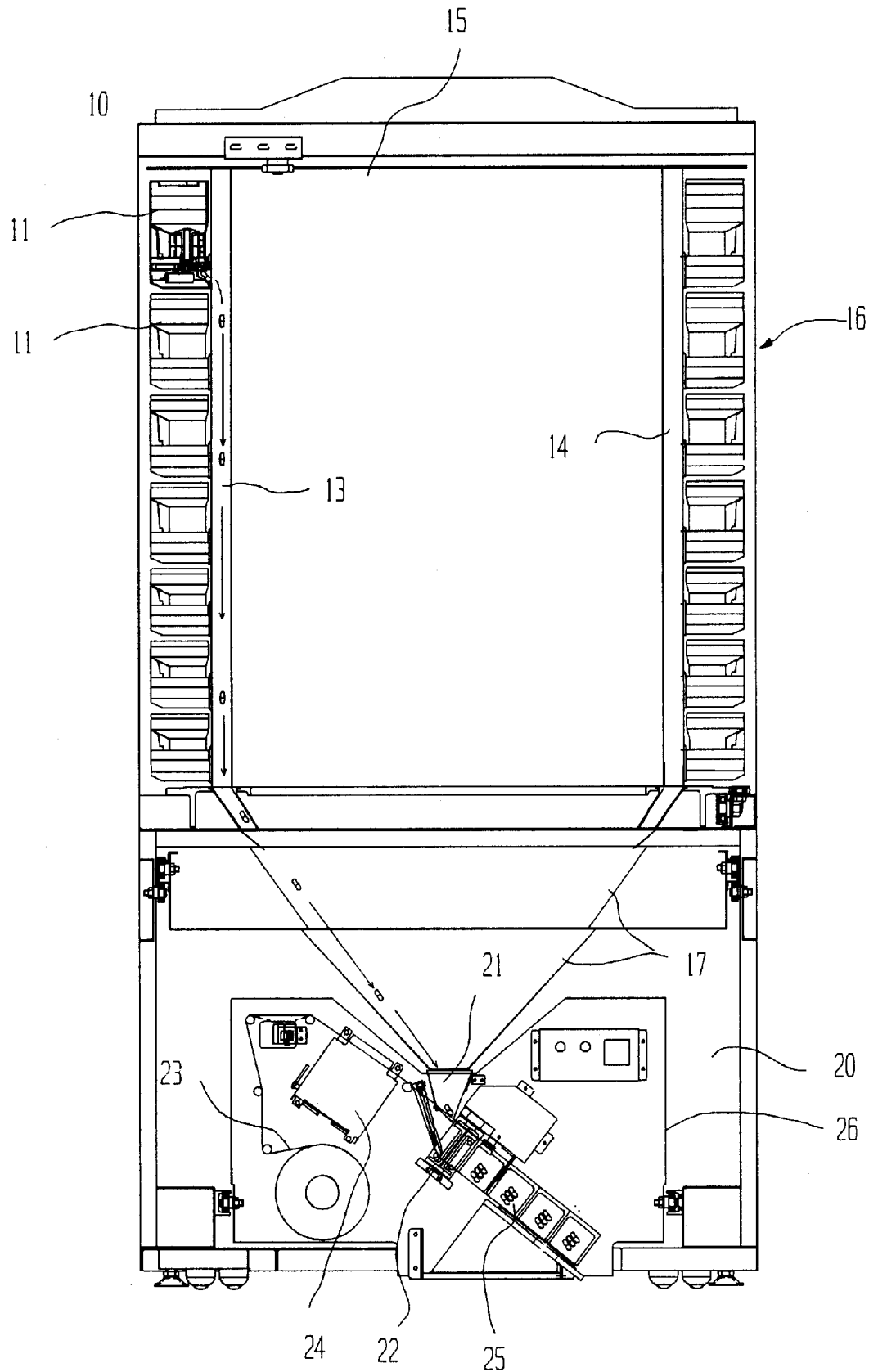
FIG. 1 is a schematic view illustrating a conventional automatic tablet dispenser with the front panel removed to show the inner components.
Figure 5:
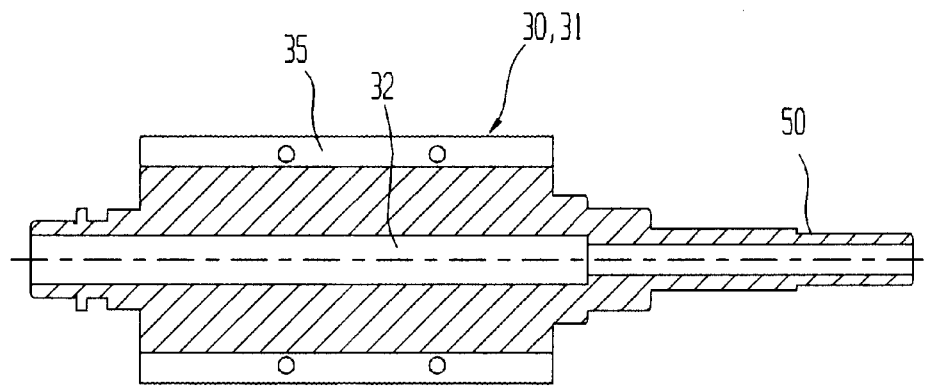
FIG. 5 is a cross-sectional view taken along line A—A in FIG. 4.
Figure 2:
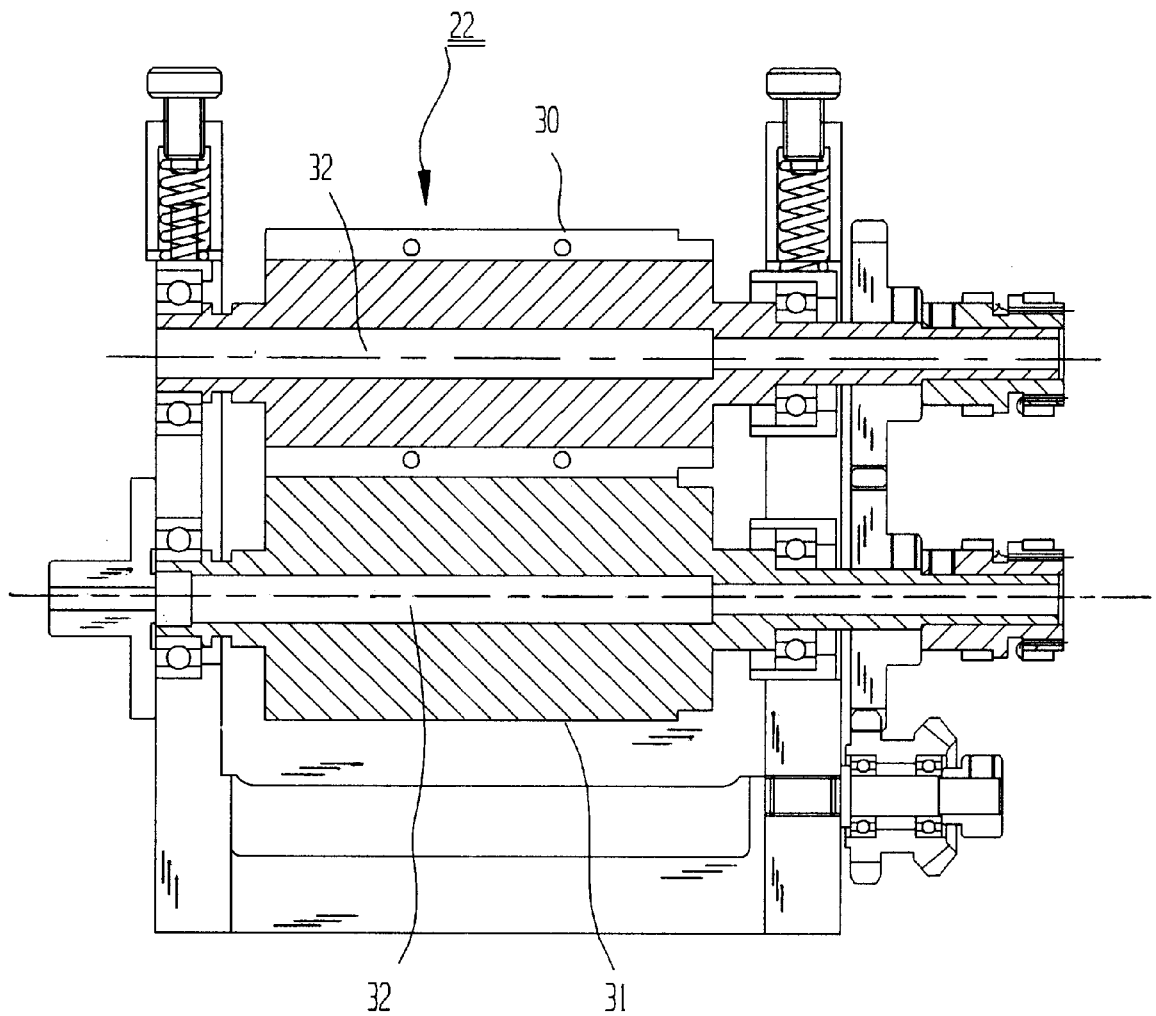
FIG. 2 is a cross-sectional view of a heating assembly for an automatic tablet dispenser according to the present utility model.

As shown in FIG. 1, an automatic tablet dispenser 10 is comprised of a tablet dropping unit 16 including a cylindrical drum 15 having release holes 13, 14 engaged thereto so as to communicate a plurality of tablet cassettes 11 which respectively store therein tablets and release a measured quantity therefrom, through the outer periphery of the release holes 13, 14, so that the tablets released from the tablet cassettes 11 are dropped through the holes 13, 14.

Below the tablet dropping unit 16, there is provided a guide hopper 17 for safely guiding the tablets being released through the release holes 13, 14 so that the tablets may not be dispersed.

A packaging unit 20 is disposed below the guide hopper 17 to package and discharge the released tablets outside the automatic tablet dispenser 10.

The packaging unit 20 includes a discharge hopper 21 for gathering the tablets dropped from the tablet dropping unit 16, a heater assembly 22 for packaging the tablets released through the discharge hopper 21, a printer 24 for printing respective information on the packaging paper 23, and a discharge conveyer 25 for externally releasing respective tablet-packaged bags.

The automatic tablet dispenser 10 is controlled by a main computer (not shown) informed of an appropriate prescription for a target patient which includes proper medicine, intake method, daily intake frequency, and intake duration.

The heater assembly 22 in the automatic tablet dispenser 10 according to the present utility model includes a pair of heating rollers 30, 31 powered by a motor 27 disposed outside a frame 26 of the packaging unit 20 and rotatably engaged with each other.

An insertion hole 32 is respectively formed through the shafts of the heating rollers 30, 31 so as to receive a heating line (not shown) therethrough. A pair of peripheral sealing surfaces 33 and a pair of axial sealing surfaces 34 are appropriately provided on the heating rollers 30, 31 to serially and rollingly discern one-dosage packaging bags. Here, the packaging paper 23 is foldedly provided between the corresponding pair of sealing surfaces 33, 34 of the heating rollers 30, 31.

Figure 3:
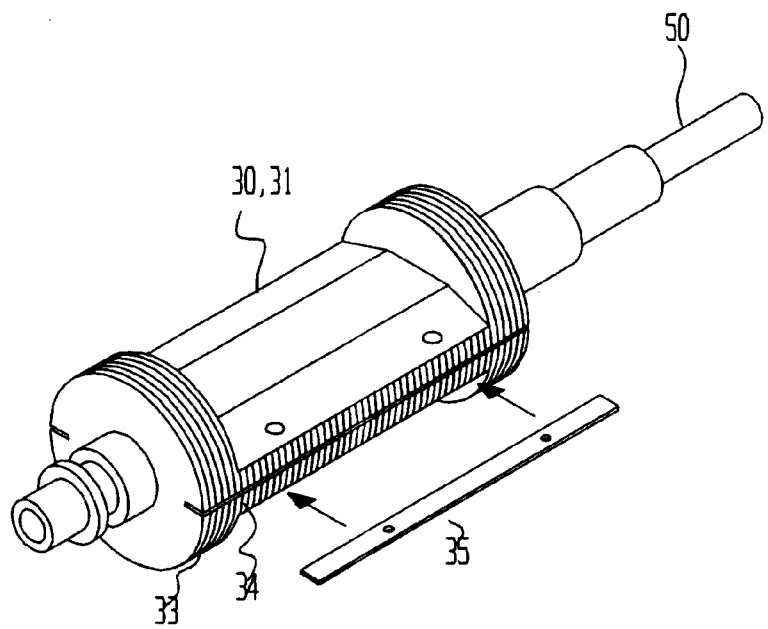
FIG. 3 is a perspective view illustrating a heating roller of the heating assembly for an automatic tablet dispenser according to the present utility model.

A cutter 35 as shown in FIG. 3 is fixedly inserted in and along an axial groove formed along at least one of the axial sealing surfaces 34 so as to facilitate both heat-sealing of the folded paper and forming a perforated line for discerning the serially rolled-in paper.

The present utility model provides the improved heating rollers 30, 31 of the heater assembly 22, wherein a slipping phenomenon is prevented during a sealing process of the packaging paper 23, thereby realizing facilitation during the tablet packaging operation.

Referring to FIGS. 2 through 5, the construction and operation of the present utility model will now be explained.

Figure 4:
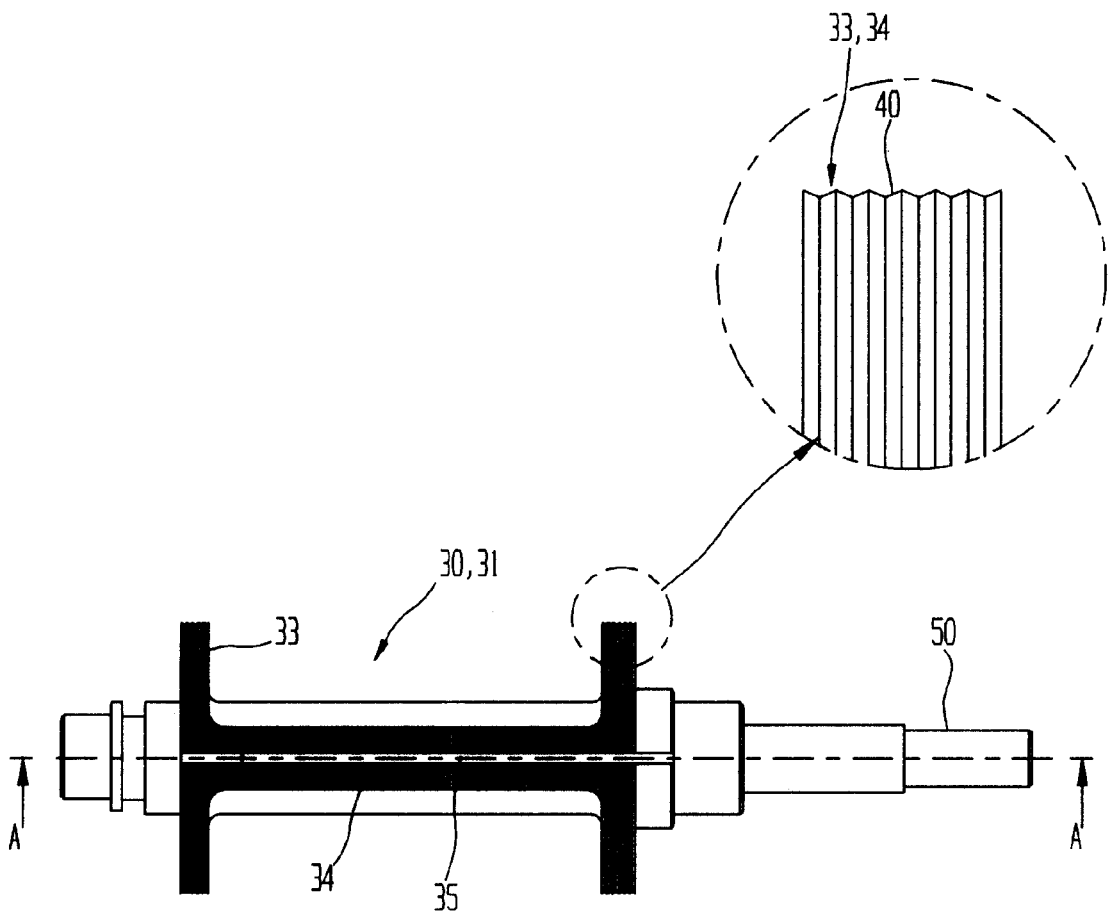
FIG. 4 is a front view of the heating roller in FIG. 3.

As shown in FIG. 4, a plurality of continuously-and-linearly ridged teeth 40 are formed along the respective peripheral and axial heating surfaces 33, 34 of the heating rollers 30, 31, thereby improving adhesivity of the packaging paper 23 and a paper pulling characteristic as well as preventing a slipping phenomenon, during the paper sealing operation. Each of the peripheral heating surfaces 33 is circularly formed at each end of the heating rollers 30, 31. Each of the axial heating surfaces 34 is continuously and axially linked between the peripheral heating surfaces 33.

In the preferred embodiment of the present utility model, the continuously-and-linearly ridged teeth 40 are vertically formed along the sealing surfaces 33, 34 of the heating rollers 30, 31. However, the continuously-and-linearly ridged teeth 40 may be shaped in a variety of formations such as continuously-and-axially ridged teeth, slanting continuously-and-linearly ridged teeth, and crossing continuously-and-linearly ridged teeth. With any of the variety of formations, a consumer can easily tear open the sealed package by tearing along a line parallel to the pattern formed by the continuously-and-linearly ridged teeth 40 on the package. That is, each tablet package sealed by the heating rollers 30, 31 can be easily ripped off along any of tablet package paper lines linearly impressed by the continuously-and-linearly ridged teeth 40.

In further detail, the heater assembly 22 according to the present utility model serves to continuously seal the one-dosage equivalent quantity of tablets released from the discharge hopper 21 by the provided packaging paper 23. That is, when the pair of heating rollers 30, 31 pulls therebetween the packaging paper 23, the folded sheet of the paper 23 is sealed vertically by the peripheral sealing surfaces 33 and horizontally by the axial sealing surfaces 34 of the heating rollers 30, 31, and at the same time a perforated line is formed between the sealed one-dosage tablets bags to facilitate the later severing of the processed one-dosage tablet bags by a consumer.

Such an operation of the heater assembly 22 is similar to that of the conventional art and a detailed technical description thereof will be omitted accordingly.

As discussed above, a plurality of continuously-and-linearly ridged teeth 40 are formed along the sealing surfaces 33, 34 of the heating rollers 30, 31 provided in the heater assembly 22 according to the present utility model, whereby a sealing characteristic is improved and a paper slipping phenomenon is prevented when the packaging paper 23 is rolled in between the heating rollers 30, 31, thereby enhancing the reliability of the entire automatic tablet dispensing system as well as facilitating the tablet packaging operation.

One of the advantages of the present invention is to enable a tablet taking consumer to easily rip off the sealed tablet package along any of its linearly impressed ridge lines by providing the continuously-and-linearly ridged teeth along the outer surface of the heating rollers. Another advantage is to allow the owner of the tablet dispensing system having the heating assembly according to the present invention to select a tougher packaging paper so that the tablets sealed within the selected tablet packaging paper can be further safely protected from an unwanted tearing.

What is claimed is:

1. A heater assembly for an improved automatic tablet dispenser comprising a tablet dropping unit having a drum communicating with a plurality of release holes which open to a plurality of tablet storing cassettes storing therein and releasing therefrom a measured quantity of tablets, wherein, the heater assembly for packaging the tablets released through said release holes into a plurality of tablet packages by use of a tablet packaging paper, comprising:

a) a pair of heating rollers each having a pair of peripheral sealing surfaces, a pair of axial sealing surfaces, a first end and a second end, wherein said each peripheral sealing surface is formed cylindrically at said each end of said each heating roller and perpendicular to the axis of said each heating roller, wherein said each axial sealing surface is linked axially between the peripheral sealing surfaces, wherein a plurality of continuously-and-linearly ridged teeth circularly disposed on and along said pair of peripheral sealing surfaces and said pair of axial sealing surfaces of each of said heating rollers, wherein each tablet package sealed by the heating rollers has several impressed continuous tablet package paper lines linearly impressed by the continuously-and-linearly ridged teeth so that the tablet packages can be easily ripped off along any of the tablet package paper lines for easy opening thereof, and wherein an axial groove is continuously and axially disposed in and along the axial sealing surface of at least one of the heating rollers; and b) a cutter fixedly inserted in and along said axial groove for forming a perforated line on a tablet packaging paper for easy separation of the tablet packages.

2. The heater assembly of claim 1, wherein the continuously-and linearly ridged teeth are continuously and axially formed between the ends of said each heating roller.

3. The heater assembly of claim 1, wherein the continuously-and-linearly ridged teeth are slantingly formed between the ends of said each heating roller.

* * * * *